Nov. 13, 1962                E. SLAMECKA                3,064,183
                    CIRCUIT-BREAKER TESTING ARRANGEMENTS
Filed April 15, 1959                                4 Sheets-Sheet 1

WITNESSES                                       INVENTOR
                                              Ernest Slamecka
                                                    BY
                                                          ATTORNEY Nov. 13, 1962  E. SLAMECKA  3,064,183
CIRCUIT-BREAKER TESTING ARRANGEMENTS
Filed April 15, 1959  4 Sheets-Sheet 3

United States Patent Office 3,064,183
Patented Nov. 13, 1962

3,064,183
CIRCUIT-BREAKER TESTING ARRANGEMENTS
Ernest Slamecka, Berlin-Schlachtensee, Germany, assignor to Siemens-Schuckertwerke Aktiengesellschaft, Erlangen, Germany, a corporation of Germany
Filed Apr. 15, 1959, Ser. No. 806,468
17 Claims. (Cl. 324—28)

This invention relates to testing devices, and concerns particularly methods and devices for testing circuit-interrupting devices at high apparent power on a low-power source.

It is an object of the present invention to provide improved simply operating apparatus for testing circuit breakers under conditions simulating the conditions of short circuit at rated apparent power as they occur in actual operation.

It is another object of the invention to provide apparatus for automatically applying to a circuit-interrupting device a voltage surge simulating a recovery-voltage transient at the instant when the current to be interrupted falls to zero.

It is a further object of the present invention to provide a simple, reliable arrangement for applying to circuit-interrupting devices a synthetic test subjecting them to the conditions which would take place if testing under actual operating conditions at full line voltage.

In accordance with simple forms of the invention there is provided a relatively low-voltage, high-current source for passing power current through a circuit breaker to be tested, and there is also provided a relatively low-power, high-voltage source for supplying an additional voltage across the terminals of the breaker, when it is open to simulate the recovery voltage which would exist under full voltage, full power conditions.

In testing the maximum breaking capacity of high-voltage circuit breakers the difficulty is often encountered in that generally the test generator supplies only the short-circuit current for which the circuit breaker is rated, but the voltage produced by the test generator is lower than the rated voltage of the circuit breaker. For this reason, so-called synthetic testing methods have been developed.

In United States patent application filed March 11, 1959, Serial Number 798,764, by Arnold Einsele, Rudolf Pratsch and Ernest Slamecka, and assigned to the Siemens-Schuckertwerke Aktiengesellschaft, a corporation of Germany, there is disclosed, and claimed, a synthetic testing arrangement for testing the interrupting capacity of high-voltage circuit interrupters. As set forth in this patent application, there is employed a second circuit-breaker unit connected in series with the test circuit-breaker unit, and a high-current source initially supplies both series circuit-breaker units with the fault current. In addition, there is utilized a high-voltage source, which supplies the recovery-voltage transient, having suitable components to shape the recovery voltage to the desired configuration.

In accordance with the aforesaid application, the high-voltage source begins to produce a voltage, which has the desired characteristics, at a time near the passage of the fault current, supplied by the high-current source, through its zero value, which recovery voltage is applied to the switchgear, to be tested, only after said fault current has passed through zero. In order to cause the high-voltage source to supply a voltage which corresponds to the recovery voltage, and which is based upon actual operating conditions, requirements or test results, the testing arrangement of the aforesaid application provides for a series connection, comprising a resistor and a capacitor, adapted to be connected to the high-voltage source, such as a charged capacitor, approximately at the time of current zero of the fault current passing through the switchgear to be tested, which connection may be made through an inductance. Shortly after the time of current zero of the fault current, that is, when the voltage across the series connection, comprising the resistance and capacitance in the high-voltage circuit, has approximately the same value as the voltage across the circuit breaker to be tested and produced by the high-current circuit, a second switch means causes the series connection, comprising said resistance and capacitance, to be connected in parallel to the switchgear to be tested. For this purpose, the aforesaid patent application employed a controlled spark gap.

In accordance with one aspect of the present invention, the switch means, for connecting the series connection comprising a resistor and capacitor in parallel to the test switchgear unit, comprises a three-electrode spark gap, in which the first electrode is connected to one terminal of the switchgear to be tested, the second electrode is connected to one terminal of the series connection comprising the resistor and capacitor, and the third electrode is connected, through an ohmic resistance, to a common point of the other terminals of the switchgear to be tested and of said series connection. It is, therefore, an object of the present invention to simplify, and to improve, the synthetic testing arrangement of the aforesaid patent application.

In accordance with a known testing arrangement, in addition to a source of high-current energy there is also provided a second source of energy, namely a high-voltage source, which has only a small current output, but which supplies a voltage, which corresponds to the desired recovery voltage, which would be applied if the circuit breaker were tested at its rating. In this known arrangement, the circuit breaker, to be tested, has connected in series therewith a second circuit breaker, which receives the trip-open impulse simultaneously or substantially simultaneously, with the circuit breaker to be tested. According to this known testing method, a current of small amplitude, but higher frequency is superimposed upon the current of the high-current circuit flowing through the circuit breaker to be tested, shortly before the time of current zero of the fault current supplied by the high-current circuit, as the circuit-breaker contacts reach the minimum interrupting distance. This causes the current flowing through the circuit breaker, to be tested, to pass through zero with the same slope with which the current of the high-current circuit would pass through zero if its flow were caused by the rated voltage of the circuit breaker, so that after the time of current zero, the recovery voltage will appear without an interval of no-voltage application. As a result, the test circuit of this known arrangement is so designed that the recovery voltage corresponds at least to the requirements as would result from the actual operating conditions, that is testing from high-power mains, or from regulations set up by engineering societies. It is a further object of the present invention to improve upon the aforesaid known testing arrangement, and in particular, to employ a low-power, high-voltage source in the synthetic testing circuit of the present invention.

Further objects and advantages will be readily apparent to those skilled in the art following a reading of the present specification, taken in conjunction with the drawings, in which.

Figure 1:
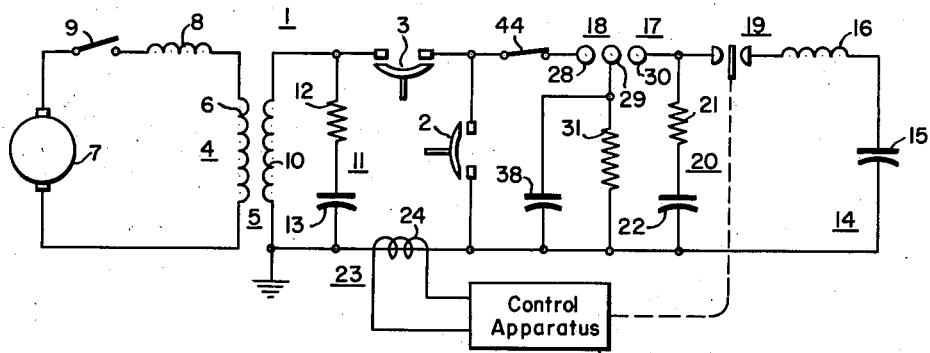
FIG. 1 is a circuit diagram representing schematically one embodiment of the present invention.

Referring to the drawings, and more particularly to FIG. 1 thereof, the reference numeral 1 generally designates a circuit-breaker testing arrangement. The circuit-breaker unit to be tested is designated by the reference numeral 2, and it is connected in series with an auxiliary circuit-breaker unit 3. The series circuit containing these two circuit breaker units 2, 3 is connected to a source of high alternating current, generally designated by the reference numeral 4. The current supply circuit 4 includes a transformer 5, the primary winding 6 of which is connected to the testing generator 7 through a current-limiting coil 8 and an operating switch 9. The generator 7, together with the transformer 5, forms the high alternating current source, which supplies the required short-circuit current at a voltage which is lower than the rated voltage of the circuit interrupter 2. As shown in FIG. 1, the test circuit-breaker unit 2 and the auxiliary circuit-breaker unit 3 are in series with the secondary winding 10 of the transformer 5.

Connected in shunt relationship with the series circuit containing the circuit-breaker units 2, 3 is a first impedance means, generally designated by the reference numeral 11. The first impedance means 11 includes a resistor 12 connected in series with a capacitor 13. This impedance means 11, including the resistance 12 and the capacitor 13, serves to set up the natural frequency and the damping of the high-current circuit 4, in order to obtain the desired slope of the recovery voltage after the passage of the current through zero from the high-current source 4.

The high-voltage source, generally designated by the reference numeral 14, includes a capacitor 15, which is charged with direct current. In series with the high-voltage source 14 is an inductance 16. There is also supplied spark-gap means, generally designated by the reference numeral 17, including a first spark-gap 19 and a second spark-gap 18.

Also associated with the high-voltage source 14 is a second impedance means, generally designated by the reference numeral 20. The second impedance means 20 includes a resistor 21 and a serially related capacitor 22. When the spark-gap 19 breaks down, the impedance branch 20 is supplied with the discharge current from the capacitor 15 through the inductance 16, and a voltage is obtained across the impedance branch 20, which has the desired slope, form and magnitude of the recovery voltage transient.

When th spark-gap 18 breaks down, the impedance branch 20, including the resistor 21 and the capacitor 22, is shunted across the test circuit breaker unit 2. The impedance branch 20 serves to produce, in a manner similar to the impedance branch 11 in the high-current circuit, a recovery voltage in the high-voltage circuit 14 of such slope, magnitude and form, as is desired to properly stress the test circuit-breaker unit 2 in accordance with standard testing rules, regulations, or requirements demanded by the customer with respect to the power system used by him.

A time-delay means, generally designated by the reference numeral 23, is employed for a purpose more fully described hereinafter. Preferably the time-delay means 23 includes a current-responsive means, or a current transformer 24, the magnetization curve of which is approximately rectangular. As shown in FIG. 1, the primary winding of the current transformer 24 is included directly in the high-current circuit 4, and the impulse generated by the current transformer 24, near the current zero, acts upon the spark-gap 19 through a control apparatus 25.

The arrangement according to the present invention differs from that disclosed in the aforesaid patent application by employing a three-electrode spark-gap 18, comprising three electrodes 28, 29 and 30, which, in the particular embodiment shown in FIG. 1, are of spherical design. The electrode 28 is connected to the upper terminal of the circuit-breaker 2 to be tested, the electrode 30 is connected to the upper terminal of the series connection comprising the resistor 21 and capacitor 22, and possibly an inductance, not shown; and the middle electrode 29 is connected through a high ohmic resistance 31 to the common point of connection of the lower terminals of the circuit breaker 2 and the second impedance branch 20. Thus, in the embodiment shown in FIG. 1, the electrode 29 is grounded through the resistor 31. The gap distances between the electrodes 28 and 29, and the electrodes 29 and 30, respectively, are equal and of such widths that the flashover will occur when the recovery voltage generated by the generator 7 and applied across the circuit-breaker 2 approximately has the same value as the voltage across the series connection comprising the resistor 21 and the capacitor 22.

Figure 2:
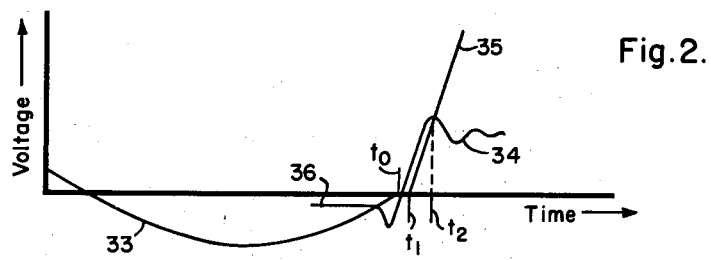
FIG. 2 illustrates graphically the voltage relationships near a current zero.

FIG. 2 shows the voltage relationships in the vicinity of current zero of the fault current wave. The current flowing through the test circuit-breaker unit 2 is indicated by the reference numeral 33. It is assumed that at the time $t=t_0$ a spacing distance between the separable contact members of the circuit breaker has been reached such that arc extinction can take place, that is, the minimum interrupting distance has been reached. At this moment, or shortly before or after this moment, the spark-gap 19 will break down. This breakdown time is indicated by the time $t=t_1$.

As shown in FIG. 2, the reference numeral 34 designates the recovery voltage across the circuit-breaker 2, which is produced by the high-current source 4. The reference numeral 35 designates the voltage across the series connection comprising the resistor 21 and the capacitor 22. The arc voltage is indicated by the reference numeral 36. As mentioned previously, the breakdown between the electrodes 28 and 29 and the electrodes 29 and 30 occurs when the voltages 34 and 35 are equal, that is at the time $t=t_2$. The arcs will then connect the series connection comprising resistor 21 and capacitor 22 in parallel to the circuit-breaker 2, so that, as described in the aforesaid patent application, the voltage 34 initially supplied by the high-current source 4 to the circuit-breaker 2 will be superseded by the voltage 35 supplied by the high-voltage source 14. As set forth in the aforesaid patent application, the recovery voltage permits subjecting the circuit-breaker 2 to the same severe interrupting conditions as would be encountered in actual field service, or as required in accordance with certain standard regulations.

The arcs between the electrodes 28, 29 and 30 are maintained also after breakdown since, due to the high capacity of of the capacitor 22 as compared to the natural capacity of the circuit-breaker 2, the voltage 34 which is supplied by the high-current source 4 will drop considerably as soon as the connection between the high-current circuit and the high-voltage circuit has been established.

It could happen that the flashovers or breakdown between the electrodes 28 and 29 and the electrodes 29 and 30 do not occur simultaneously. For example, if the breakdown between the electrodes 29 and 30 should occur first, the potential of the electrode 29 would be increased to the value of the potential of the electrode 30, and a flashover between the electrodes 28 and 29 could take place only after the voltages 34 and 35 differ from each other by a considerable amount. This difficulty can be obviated by connecting a capacitor 38 in parallel to the ohmic resistor 31. In this case, a delay will be introduced into the increase of the voltage of the center electrode 29, so that if a flashover occurs first between the electrodes 29 and 30, a flashover will immediately follow between the electrodes 28 and 29. It is to be noted that the value of the resistor 31 is high as compared to the value of the resistor 21, and the capacitance of the capacitor 38 is small as compared to the capacitance of the capacitor 22.

As mentioned before, the employment of a three-electrode spark-gap arrangement 18 renders a special control device superfluous since the control of the three-electrode spark-gap arrangement does not need the current in the high-current circuit and a timing element, but utilizes as control values the recovery voltages 34 and 35 of FIG. 2.

Figure 3:
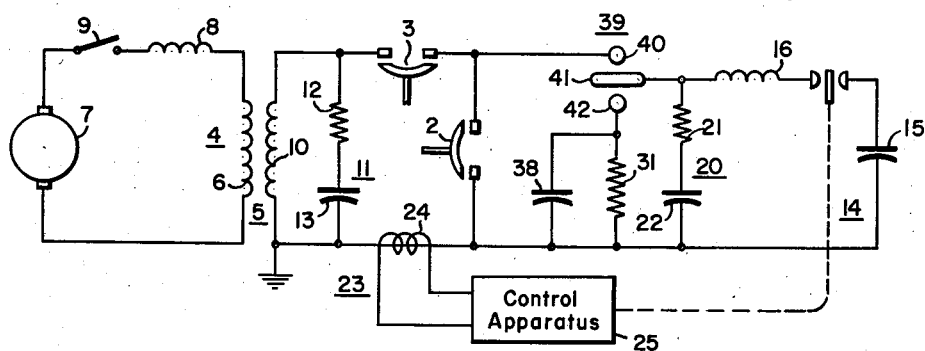
FIG. 3 illustrates schematically a modified testing arrangement in accordance with the principles of the present invention.

FIG. 3 shows a modified arrangement of the invention in which there is also provided a three-electrode spark-gap device, designated generally by the reference numeral 39. Here, the spherical electrode 40 is connected to the upper terminal of the circuit-breaker 2. The electrode 41, which is connected to the upper terminal of the series connection 20 comprising resistor 21 and capacitor 22, is disc-shaped and represents the center electrode. The third electrode 42 of the spark-gap arrangement 39 is grounded through the ohmic resistor 31 and capacitor 38. A flashover will occur between the two measuring electrodes 41 and 42 at a certain value of the voltage 35 at the time $t_2$, as shown in FIG. 2. After the flashover, both the electrode 41 and the electrode 42 will momentarily be at practically ground potential, due to the capacitor 38, whereby there also occurs a flashover between the electrodes 40 and 41.

As distinguished from the arrangement as shown in FIG. 1 in the modified circuit of FIG. 3 only the arc between the electrodes 40 and 41 establishes the connection between the high-current circuit and the high-voltage circuit, so that this arc which causes a substantially higher current than the arc between the electrodes 41 and 42 will not affect the operating voltage of the spark gap comprising the electrodes 41 and 42. The space between the electrodes 40 and 41 and thus the space between the electrodes 41 and 42 are so selected that the peak value of the arc voltage 36, as indicated in FIG. 2, cannot cause a flashover between the electrodes 40 and 41.

Figure 4:
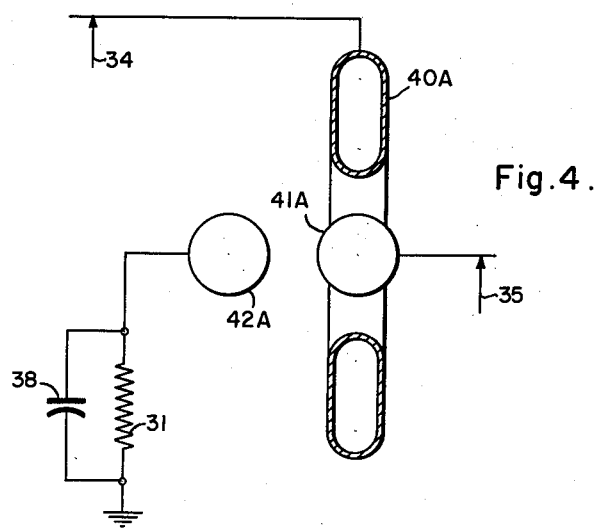
FIGS. 4–6 illustrate modified-type spark-gap arrangements.
Figure 5:
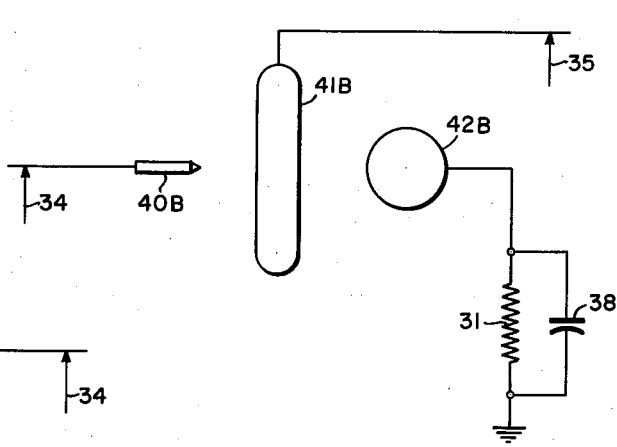
Figure 6:
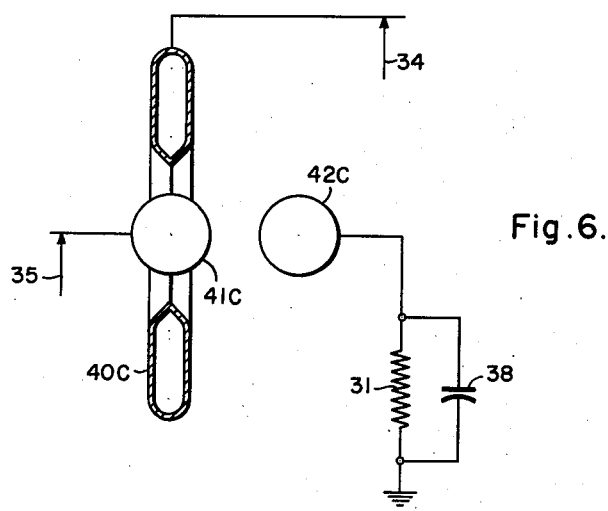

FIGS. 4, 5 and 6 illustrate modifications of the three-electrode system of FIG. 3. In these figures, only the electrodes, as well as the ground resistance 31 together with the parallel capacitor 38, are shown.

According to the modified electrode system of FIG. 4, the electrode 40A connected to the high-current circuit is of annular configuration. Within the ring-shaped electrode 40A there is disposed the spherical electrode 41A, which is connected to the high-voltage circuit. Positioned laterally of the electrode 41A is another spherical electrode 42A, which is grounded through the resistor 31 and the capacitor 38. The arrows and the related reference numerals 34 and 35 indicate the voltages, which the electrodes 40A and 41A have applied thereto.

As a spark occurs between the electrodes 41A and 42A at a predetermined voltage 35, this flashover will cause the gap between the electrodes 40A and 41A to be ionized due to the spacial arrangement of the electrodes, as shown in FIG. 4, so that a flashover between the electrodes 40A and 41A will now be facilitated. As a result, the spacing between the electrodes 40A and 41A may be made larger than with the electrode arrangement according to FIG. 3. This results in an improved insulation between the high-current circuit and the high-voltage circuit, or, if the spacing is the same, a more reliable arc connection is provided between these two circuits.

FIG. 5 illustrates fragmentarily a further embodiment of the invention wherein the polarity-dependent value of the striking voltage of the electrode arrangement comprising a point-shaped electrode 40B and a plate-shaped electrode 41B is utilized. The electrode 40B associated with the high-current circuit is point-shaped, and the electrode 41B, associated with the high-voltage circuit, assumes the configuration of a plate. The grounded electrode 42B again is spherical. The arrangement is such that the recovery voltage 34 will appear at the point-type electrode as a positive voltage. This represents an arrangement for reliably insuring a flashover between the electrodes 40B and 41B after the occurrence of a flashover between the measuring gaps 41B and 42B and higher arc voltages may occur previously without causing a premature breakdown since the peak arc voltage would appear at the electrode 40B as a negative voltage.

FIG. 6 illustrates a modified spark-gap arrangement which combines the characteristics of the spark-gap arrangements shown in FIGS. 4 and 5, discussed above. Here, the spherical electrode 41C has again applied thereto the recovery voltage 35, and the spherical electrode 42C is grounded through the resistor 31 and the parallel capacitor 38. The electrode 40C, which has applied thereto the voltage 34, annularly surrounds the spherical electrode 41C. The annular electrode 40C has a sharp interior edge, which electrically acts somewhat like a point. If the voltages are again applied so that the recovery voltage 34 will appear as a positive voltage at the point-type electrode 40C, then the dielectric strength of the space between the electrodes 40C and 41C will be reduced under the influence of the arc between the electrodes 41C and 42C. Upon the application of negative voltage, such as the arc voltage 36, to the electrode 40C, the breakdown voltage between the electrodes 40C and 41C is substantially higher than the breakdown voltage between these two electrodes when the electrode 40C is positive. Preferably a high ohmic resistance is connected in parallel to the capacitor 22 in the arrangements according to FIGS. 3 to 6 in order to fix the potential of the electrode 41C to a certain value prior to the breakdown of the gap between electrodes 41C and 42C.

As mentioned hereinbefore, the arc voltage 36 must be prevented from causing an undesirable firing of the spark-gap arrangements. This can be done, for example, by selecting a breakdown voltage between the electrodes 40 and 41 which is higher than the maximum arc voltage 36, or, as illustrated in FIGS. 5 and 6, the differential of the striking voltage of a point-type electrode relative to a plate electrode at positive and negative voltages of the pointed electrode may be utilized for the same purpose.

However, it is possible that a relatively high-arc voltage may appear momentarily upon an earlier current zero of the current wave, or that the recovery voltage reaches a higher value prior to the refiring respectively, so that the spark-gap arrangement might in certain circumstances break down. In order to prevent this, a controlled switch 44 (FIG. 1) may be connected between electrode 28 and the upper terminal of the circuit-breaker 2, this switch 44 being closed only when the arc voltage 36 is again substantially horizontal during the half cycle of the current wave immediately prior to the final current zero.

A modified form of the invention, as illustrated in FIGS. 7–10, concerns a method for testing the interrupting ability of circuit breakers during the interruption of currents, and includes an auxiliary circuit breaker connected in series with the circuit breaker to be tested, a high-current source supplying both circuit breakers, and a high-voltage source for supplying the desired recovery voltage. The high-current circuit is suitably designed, by a proper selection of the value of its voltage, frequency and damping, to initially apply a recovery voltage having the desired characteristics to the circuit breaker unit to be tested. The high voltage source is connected into circuit during the region of the first peak of the recovery voltage supplied by the high-current source. By the "region" is meant the attainment of the maximum peak recovery voltage, or shortly before, or after, the attainment of the first maximum peak of the recovery voltage supplied by the high-current source.

By setting up suitable conditions in the testing circuit, the resultant voltage, obtained from the voltage applied to the circuit breaker unit under test from the high current source and from the voltage applied to the circuit breaker unit under test from the high-voltage source, may be caused to fulfill the testing requirements based upon test regulations, or requirements imposed by utility customers with respect to the power supply available to them. As compared to conventional testing methods, set forth above, the method according to the invention, illustrated in FIGS. 7–10, has the advantage that a low-power, high-voltage source may be used, since it need not furnish a portion of the short-circuit current passed through the circuit breaker unit to be tested. For carrying out the method, there may be provided, for example, a series connection comprising an ohmic resistor and a capacitor connected in parallel to the circuit breaker to be tested, and another series connection comprising a resistor and a capacitor and connected in parallel to the auxiliary circuit breaker unit. The series connection, including the ohmic resistor and capacitor connected in parallel to the test circuit breaker unit, is connected to the high-voltage source, such, for example, as a charged capacitor, through a controlled switch means, and possibly through an inductance.

The controlled switch means is closed in the region of the first peak of the recovery voltage applied to the test circuit breaker unit by the high-current source. In addition, this switch means may comprise a spark gap including an initiating electrode. Preferably the initiating electrode is connected to a resistor, which, in turn, is connected in parallel to the test circuit-breaker unit through a measuring spark gap. This measuring spark gap is fired at a certain predetermined voltage across the test circuit-breaker unit, and, after it has fired the initiating electrode will receive the voltage, and will then cause the main spark gap to break down.

Figure 7:
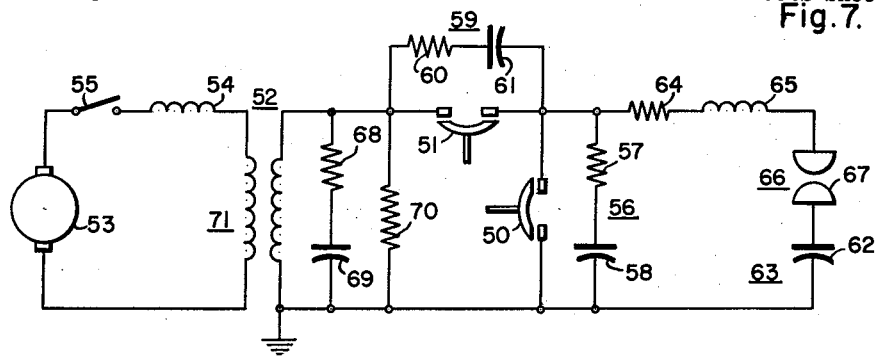
FIG. 7 illustrates a modified type synthetic testing arrangement.

More particularly, with reference to FIG. 7 the circuit breaker unit under test is indicated by the reference numeral 50, and the auxiliary circuit-breaker unit, connected in series therewith, is indicated by the reference numeral 51. The series circuit including these two circuit breaker units 50 and 51 is connected to the secondary winding of a transformer 52, which is connected to a generator 53 through an inductance 54 and a switch 55. In parallel to the circuit breaker test unit 50 there is a series connection, or an impedance branch 56, including a serially related ohmic resistor 57 and a capacitor 58.

Connected in parallel to the auxiliary circuit breaker unit 51 is a series connection, or an impedance branch, generally designated at 59, and including a resistor 60 and a capacitor 61.

The series connection 56, comprising the resistor 57 and capacitor 58, is connected to a charged capacitor 62, constituting a high-voltage source, generally designated by the reference numeral 63, through an ohmic resistor 64 (which may be omitted), an inductance 65, and a controlled switch means, generally designated the reference numeral 66. Preferably the controlled switch means 66 assumes the form of a spark-gap means 67.

It is primarily by means of the inductance 54, the resistor 68, the capacitor 69, and a damping resistor 70 that the recovery voltage imposed across the test circuit-breaker unit 50 is so adjusted, following the interruption of the rated short-circuit current, that its characteristics conform to the desired recovery voltage, which would be obtained from a high-power source. Or, the recovery voltage applied to the test unit 50 from the high-current source, generally designated by the reference numeral 71, may be made to conform to any desired requirements imposed in regard to the testing procedure.

The resistor 60 and the capacitor 61, as well as the resistor 68 and the capacitor 69 have very little influence upon the characteristic of the recovery voltage 72, supplied by the generator 53 to the test circuit interrupter unit 50, after the interruption of the short-circuit current. With respect to the high-current source 71, these elements rather have the function of distributing the recovery voltage in the desired manner between the auxiliary circuit breaker unit 51 and the circuit breaker unit 50 under test, this voltage distribution being made to distribute the larger portion of the recovery voltage across the test circuit-breaker unit 50. Corresponding to the relatively low short-circuit power of the high-current source 71, including the transformer 52, the inductance 54 and the generator 53, the recovery voltage 72 will reach a value, at full short-circuit current, which represents only a fraction of the voltage required for the accurate testing of the circuit-breaker unit 50 under rated voltage.

In order to obtain a recovery voltage across the circuit breaker unit 50, which has the desired value and shape, this recovery voltage, which is supplied to the test circuit breaker unit 50 by the generator 53, has added thereto, or superimposed thereon, a voltage from the high-voltage source 63 upon the breakdown of the spark-gap means 67. The value of the latter recovery voltage from the high-voltage source 63 can be selected as desired, and essentially is determined by the voltage across the charged capacitor 62. The charged capacitor 62 could be replaced, for example, by a small generator having the same frequency as the generator 53 and operating in synchronism therewith. However, high-voltage mains may be employed, if available. In particular, such high-voltage mains may also replace the high-current source 71.

Figure 8:
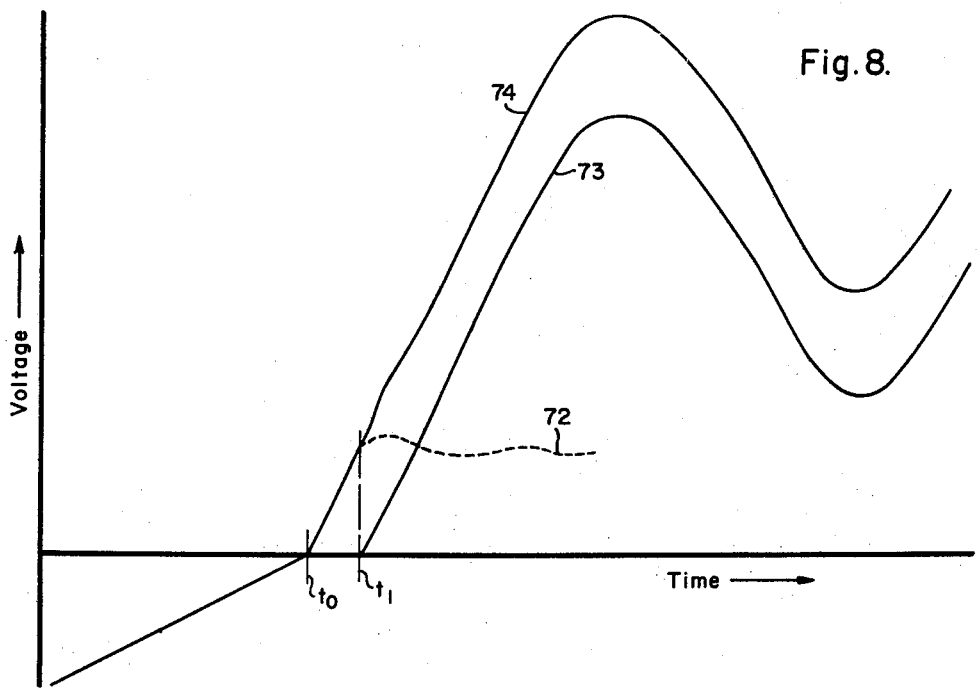
FIG. 8 illustrates graphically the voltage relationships of the arrangement of FIG. 7 near a current zero.

The frequency of the voltage across the test circuit breaker unit 50, which is supplied by the high voltage source 63, is primarily determined by the capacitors 58 and 61, and by the inductance 65, whereas its damping depends upon the ohmic resistances 64, 57, 60 and 70. These elements are so selected that the voltage applied to the test circuit-breaker unit 50 by the high-voltage circuit 63 has approximately the same configuration as is required for the desired recovery voltage. This recovery voltage, which is obtained upon the breakdown of the spark gap 67, considered independently of the recovery voltage of the high-current source 71, is indicated in FIG. 8 by the reference numeral 73. It begins at $t_1$ in FIG. 8 at a zero value, since the capacitor 58 has no charge. FIG. 8 also shows the voltage 72, which would be supplied to the circuit breaker test unit 50 by the generator 53 as a recovery voltage, if the spark gap 67 would not break down. In truth, however, the capacitor 58 has the voltage 72 thereacross at the moment $t=t_1$, and at this moment the spark gap 67 will break down also.

Thus, the following conditions exist: Up to the moment $t=t_1$, the voltage across the circuit breaker 50 is dependent only upon the generator 53, so that the recovery voltage across circuit breaker unit 50 corresponds to the voltage 72. If the spark gap 67 breaks down at $t_1$, the circuit breaker unit 50 will have applied thereacross the resultant voltage 74 from the moment indicated at $t_1$ due to the cumulative effect of the two circuits, namely the high-current circuit 71 and the high-voltage circuit 63. The time $t_1$ occurs within the region of the maximum peak voltage of 72. This moment is so selected, and the individual elements of the circuit — resistances, capacitors and inductances — are so dimensioned, that the recovery voltage 74 across the circuit breaker unit 50 will meet the requirements based upon test results, regulations, or requests made by utility customers.

In FIG. 8 it has been assumed that the breakdown of the spark gap 67 occurs shortly before the first maximum peak of the recovery voltage 72. From this simplified illustration of the superposition of the voltage 72 of the high-current circuit 71 with the recovery voltage 73 of the high-voltage circuit 63 after the breakdown of the spark gap 67, it follows that, if the resultant voltage is required to have a substantially linear ascent, the recovery voltage 72 of the high-current circuit 71 must be considerably damped while building up. Otherwise the resulting voltage 74 would become considerably non-linear, particularly in the initial portion of its curve. Such damping of the voltage 72 of the high-current circuit 71 is effected particularly by the resistor 70.

For testing the interrupting capacity of the circuit-breaker test unit 50, the circuit-breaker units 50 and 51 are first closed, and subsequently the switch 55 is closed. Now, the short-circuit current from the generator 53 will flow through the circuit-breaker units 50 and 51, which simultaneously, or substantially simultaneously receive the trip-open impulse. After the first passage of the short-circuit current through zero, arcing will again occur in both circuit-breaker units 50 and 51 due to the recovery voltage generated by the generator 53, and there are provided other means for effecting restriking of the arc. Restriking will continue until the minimum interrupting distance has been reached. As the short-circuit current passes through zero shortly before, or upon reaching this minimum interrupting distance, a recovery voltage 72 will appear across the circuit-breaker test unit 50, which recovery voltage, as previously mentioned, can be so selected, depending upon the resistor 68, the capacitor 69 and the resistor 70, that its slope will correspond at least to the initial slope of the desired recovery voltage. As mentioned hereinbefore, the spark gap 67 will be fired in the region of the first maximum of the recovery voltage 72, so that now the high-voltage source 63 will be connected into the circuit. As also mentioned before, the method according to the invention provides a recovery voltage 74 across the circuit-breaker unit 50, which corresponds to the actual recovery voltage obtained when the circuit-breaker test unit is tested, while connected to high-power mains and at short-circuit power, or to the voltage as prescribed by test regulations. In this manner the circuit-breaker unit 50 is tested as to its dielectric strength, as well as to its resistivity to the arc power, or arc energy. The method, according to the invention, is not limited to the testing of the interrupting capacity at the minimum interrupting distance, but it may also be applied to determining the interrupting capacity of the circuit-breaker unit 50 at other contact spacings. To obtain this end, the short-circuit arc may also be initiated by means of a fuse wire, or by means of an auxiliary discharge.

Figure 9:
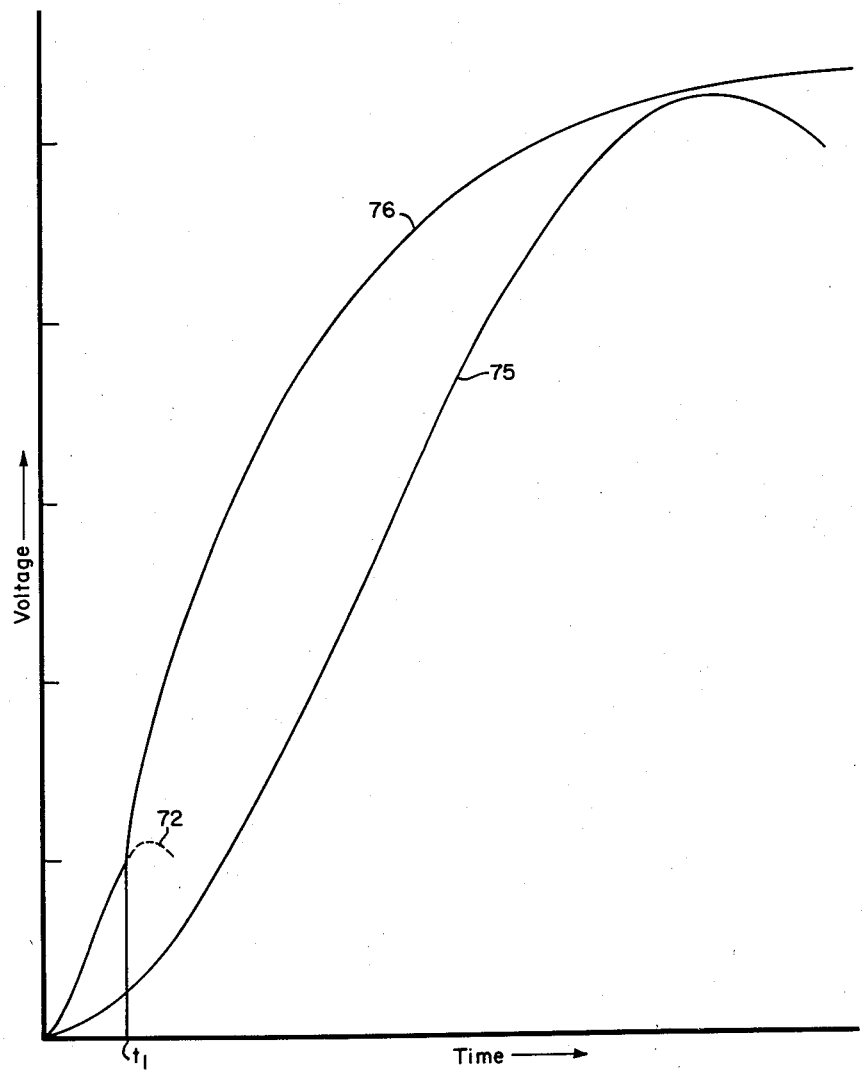
FIG. 9 illustrates graphically a desired recovery voltage transient, and how an application of the present invention may approximate the desired transient; and, FIG. 10 illustrates a modification of the testing arrangement of FIG. 7.

It is not absolutely necessary that the recovery voltage 74 correspond exactly to the required recovery voltage. However, the recovery voltage 74 should always be so selected that the voltage test of the circuit breaker test unit 50 will not be rendered less severe than prescribed. For example, the test may be conducted by omitting the inductance 65, and with an aperiodic recovery voltage from the high-voltage source. If, for example, a recovery voltage is required, such as indicated in FIG. 9 by the reference numeral 75, then, after omitting the inductance 65, a resultant aperiodic voltage 76 can be obtained across the test circuit-breaker unit 50, which subjects the circuit breaker to a more severe test, thereby increasing the safety factor of the circuit-breaker test, and at the same time reducing the cost of the test equipment.

Figure 10:
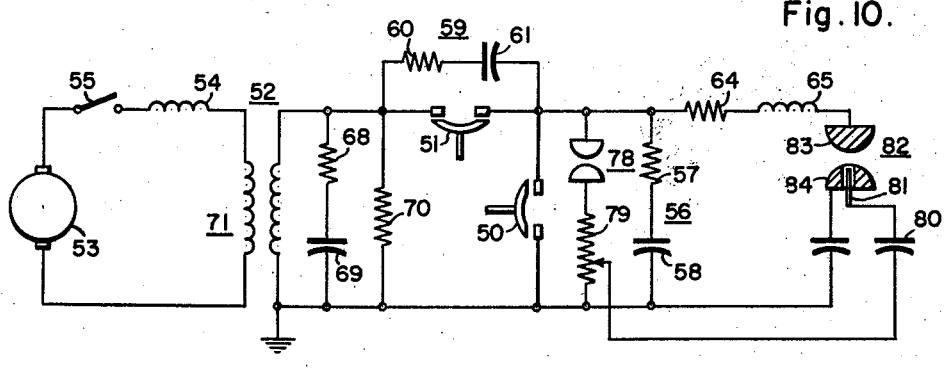

The controlled switch means 66, which connects the high-voltage circuit 63 into the circuit, and which is represented in FIG. 7 as a controlled spark gap 67, may be rendered operative, for example, by applying an impulse at the current-zero passage of the last half wave of the short-circuit current, which impulse is applied to the controlled switch means 66 with such a time delay, as introduced by a time-delay device, that the controlled switch means 66, that is, the spark gap 67, will be closed within the region of the maximum of the recovery voltage 72. It is, however, particularly simple to effect this control in dependence upon the value, or magnitude, of the voltage 72. For this purpose, for example, and considering FIG. 10 a measuring spark gap 78 may be provided in parallel to the test circuit-breaker unit 50 through a resistor 79. The measuring spark gap 78 is so arranged that it will break down at the desired voltage, that is, at the first maximum of the recovery voltage 72, or shortly before this moment. After such a breakdown, this voltage will appear across the resistor 79 as a surge. As illustrated in FIG. 10 this voltage impulse, or a portion thereof is applied through a high-voltage capacitor 80 to an auxiliary or an initiating electrode 81 of a spark gap 82, including electrodes 83 and 84, which take the place of the spark gap 67 shown in FIG. 7. This voltage impulse will effect a flash-over between the auxiliary, or initiating, electrode 81 and the main electrode 84, such firing consequently initiating a firing between the main electrodes 83 and 84 of the spark gap 82.

It will be apparent to those skilled in the art that the method according to the invention, which has been explained as supplied to the testing of high-voltage circuit breaker units, may also be employed for testing other types of switchgear or switching apparatus, such as current converters.

I claim as my invention:

1. An arrangement for testing circuit-breaker units at rated kilovolt amperes without the expenditure of a corresponding amount of power, said arrangement including in combination with the circuit-breaker unit to be tested, an auxiliary circuit-breaker unit, one of the terminals of the test circuit-breaker unit being close to ground potential, a source of high alternating current, means connecting said circuit-breaker units in series with the high current source, a high-voltage source for applying a simulated recovery voltage to the breaker unit under test, the auxiliary circuit-breaker unit preventing the imposition of high voltage across said source of alternating current, a first spark gap, impedance means including a resistor and a capacitor connected to said high-voltage source through the first spark-gap, a second three-electrode type spark-gap, said impedance means connected in shunting relationship with said circuit-breaker unit to be tested through said second three-electrode type spark-gap, means responsive to the passage of the current close to zero from the current source to cause breakdown of the first spark-gap, to cause thereby the high current source alone to provide the initial portion of the recovery voltage transient, only the first spark-gap being fired in dependency upon a quantity of the high-current circuit, and means for breaking down said second three-electrode type spark-gap at a subsequent time.

2. The invention according to claim 1, wherein one of the three-electrodes of the three-electrode type spark gap is connected to a terminal of the circuit-breaker unit under test, a second electrode of the three-electrode type spark-gap is connected to said impedance means and the third electrode is connected to ground potential through a resistance.

3. The combination according to claim 2, wherein a a capacitor is connected in parallel with the said resistance.

4. The invention according to claim 1, wherein one of the three electrodes is a point-type electrode.

5. The invention according to claim 1, wherein one of the three electrodes in an annular electrode.

6. The invention according to claim 1, wherein one of the three electrodes is an annular electrode with a sharp interior edge.

7. The invention according to claim 1, wherein one of the three electrodes connected to said impedance means is a disc-type electrode.

8. An arrangement for testing circuit breaker units including in combination with a unit to be tested, an auxiliary circuit-breaker unit, a high-current source, a high-voltage source for applying a simulated recovery voltage to the breaker unit under test, means connecting said circuit-breaker units in series circuit relation to said high-current source, means connecting the high-voltage source across the circuit-breaker unit to be tested, the high-current source initially supplying the initial portion of the desired recovery voltage, an impedance branch including a resistor and a capacitor permanently connected in parallel with the circuit-breaker unit under test, and delayed controlled switch means for connecting said impedance branch to said high-voltage source only near a time when the recovery voltage from the high-current source reaches the vicinity of its first maximum.

9. The testing arrangement according to claim 8, wherein the controlled switch means includes spark-gap means adapted to be broken down at the aforesaid time.

10. The testing arrangement according to claim 8, wherein a second impedance branch including a serially related resistor and a capacitor are connected in shunt across said auxiliary circuit-breaker unit.

11. An arrangement for testing circuit-breaker units at rated kilovolt amperes without the expenditure of a corresponding amount of power, said arrangement including in combination with the circuit-breaker unit to be tested, an auxiliary circuit-breaker unit, a source of high alternating current, means connecting said circuit-breaker units in series with the high current source, a high-voltage source for applying a simulated recovery voltage to the breaker unit under test, means connecting the high-voltage source only across the circuit-breaker unit under test, means opening both breaker units at substantially the same time during a test operation, impedance means associated with said source of high alternating current for causing the alternating current source to initially supply the initial portion of the desired recovery voltage, and voltage responsive means responsive to the voltage across the circuit-breaker unit under test for connecting said high-voltage source across the circuit-breaker unit under test in the vicinity of the first maximum of the recovery voltage supplied by the high-current source.

12. The circuit-breaker testing arrangement according to claim 11, wherein said voltage responsive means includes an impedance branch including a spark-gap means and a resistor connected at all times in shunt across the circuit-breaker unit to be tested.

13. The circuit-breaker testing arrangement according to claim 11, wherein the voltage responsive means is arranged to be actuated at a time close to the time when the recovery voltage supplied by the alternating-current source reaches the vicinity of its first maximum.

14. An arrangement for testing circuit breaker units including in combination with a unit to be tested, an auxiliary circuit-breaker unit, a high-current source, a high-voltage source for applying a simulated recovery voltage to the breaker unit under test, means connecting said circuit-breaker units in series circuit relation to said high-current source, means connecting the high-voltage source across the circuit-breaker unit to be tested, the high-current source initially supplying the initial portion of the desired recovery voltage, an impedance branch including a resistor and a capacitor connected in parallel with the circuit-breaker unit under test, another impedance branch including a resistor and a serially related spark-gap means in shunt across the circuit-breaker unit under test, another spark-gay means having an initiating electrode for connecting said high-voltage source across the circuit-breaker unit under test, and connecting means for connecting said initiating electrode to a portion of the resistor of said other impedance branch to effect breakdown of said other spark-gap means upon breakdown of the first said spark-gap means.

15. The circuit-breaker testing arrangement according to claim 14, wherein a third impedance branch including a resistor and a capacitor are connected in shunt relationship across said auxiliary circuit-breaker unit.

16. The circuit-breaker testing arrangement according to claim 14, wherein the connecting means for the initiating electrode includes a serially related capacitor.

17. An arrangement for testing circuit breaker units including in combination with a unit to be tested, an auxiliary circuit-breaker unit, a high-current source, a series connection including a resistor and a capacitor connected in shunt across the two circuit-breaker units, a resistor connected in shunt across the last-mentioned series connection, a high voltage source for applying a simulated recovery voltage to the breaker unit under test, means connecting said circuit-breaker units in series circuit relation to said high-current source, means connecting the high-voltage source only across the circuit-breaker unit to be tested to the exclusion of the auxiliary circuit-breaker unit, the high-current source initially supplying the initial portion of the desired recovery voltage, and means delaying the imposition of the simulated recovery voltage across the breaker unit under test from said high-voltage source until the time when the recovery voltage from the high-current source reaches the vicinity of its first maximum.

References Cited in the file of this patent

UNITED STATES PATENTS

| 2,173,706 | Biermanns | Sept. 19, 1939 |
| 2,201,852 | Deerhake | May 21, 1940 |
| 2,508,954 | Latour | May 23, 1950 |
| 2,888,639 | Petermichl | May 26, 1959 |

FOREIGN PATENTS

| 1,014,659 | Germany | Aug. 29, 1957 |